(12) United States Patent
Rockwood

(10) Patent No.: US 6,260,373 B1
(45) Date of Patent: Jul. 17, 2001

(54) HEAT EXCHANGER WITH DOUBLE VIBRATION ISOLATION

(75) Inventor: William B. Rockwood, Onalaska, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/505,291

(22) Filed: Feb. 16, 2000

(51) Int. Cl.$^7$ ............................... F25D 19/00; F28F 7/00
(52) U.S. Cl. .................. 62/295; 62/466; 165/69
(58) Field of Search .................... 62/295, 466, 465; 165/67, 69; 248/550, 638

(56) References Cited

U.S. PATENT DOCUMENTS

| | | |
|---|---|---|
| 2,711,285 | 6/1955 | Burrowes . |
| 4,216,937 * | 8/1980 | Bridgnell et al. ................ 165/69 X |
| 4,330,030 | 5/1982 | Cate . |
| 4,984,971 | 1/1991 | Bergeron . |
| 5,040,953 * | 8/1991 | Tinsler ............................ 248/638 X |
| 5,141,201 | 8/1992 | Mizuno, et al. . |
| 5,306,121 | 4/1994 | Heflin et al. . |
| 5,839,295 | 11/1998 | Lehmann . |
| 6,015,131 * | 1/2000 | Brewer, III ........................ 248/638 |
| 6,029,345 * | 2/2000 | Christensen ...................... 165/67 X |

* cited by examiner

Primary Examiner—Henry Bennett
Assistant Examiner—Chen Wen Jiang
(74) Attorney, Agent, or Firm—William J. Beres; William O'Driscoll; Peter D. Ferguson

(57) ABSTRACT

A heat exchanger within a sheet metal enclosure includes mounting structure that provides double vibration isolation to minimize noise. The mounting structure includes at least one resilient vibration isolator that couples the heat exchanger to a vibration isolation plate, and includes other similar isolators that couple the plate to the enclosure. The mass of the plate is sufficient to somewhat emulate a dual mass/spring system having two degrees of freedom. To this end, the plate is preferably thicker than the sheet metal walls of the enclosure. The double vibration isolated heat exchanger is especially applicable to systems having several heat pumps that are mounted overhead. In some embodiments, the heat pump's refrigerant compressor is also resiliently mounted to the vibration isolation plate.

17 Claims, 1 Drawing Sheet

HEAT EXCHANGER WITH DOUBLE VIBRATION ISOLATION

BACKGROUND OF THE INVENTION

1. Field of the Invention

The subject invention generally pertains to a heat exchanger and more specifically to a mounting structure that provides the heat exchanger with double vibration isolation.

2. Description of Related Art

A typical water-source heat pump includes a compressor that compresses and circulates refrigerant in series-flow through two heat exchangers and a flow restriction (e.g., an expansion valve). One heat exchanger transfers heat between the refrigerant and an external source of water (e.g., ground water). The other heat exchanger transfers heat between the refrigerant and a comfort zone, such as a room or other area within a building. Often a four-way valve determines whether the heat pump heats or cools the comfort zone by selectively directing the refrigerant flow in a forward or reverse direction.

Heat pumps are often, but not always, installed as a system of several heat pumps, where each individual heat pump serves its own particular zone within a building, such as an apartment unit, hotel room, dormitory room, or classroom. A network of pipes interconnecting the heat pumps typically conveys water to and from each individual unit. Each heat pump unit often has its own supply and return air duct for its particular comfort zone.

When heat pumps are installed as a system of several units, often the most convenient location to install the units, the water piping, and the air ducts is overhead, or above the ceiling of each comfort zone. With the heat pumps in such proximity with the comfort zones, it becomes important to minimize any noise generated by the heat pumps. Noise is primarily created by the components that have moving parts, such as the compressor and a blower that forces the conditioned air through the room.

To provide a cushioned mounting for blowers or to minimize noise created by a compressor, such components can be mounted using vibration isolators, such as rubber grommets. Examples of such isolators are shown in U.S. Pat. Nos. 2,711,285; 4,984,971; 5,839,295; and 5,306,121. Further isolation can be achieved by installing an intermediate mounting plate between the compressor and a stationary base, as shown in the '971, '295, and '121 patents.

However, in conventional heat pumps, the effectiveness of a high performance compressor isolation system can be compromised by vibration and/or pressure pulsations transmitted to auxiliary components in direct contact with the compressor. One such component is the water-to-refrigerant heat exchanger. Typically, these components are not isolation mounted. Vibration transmission from the compressor to the unit structure via these components can become the controlling factor in heat pump noise.

SUMMARY OF THE INVENTION

To minimize noise that could be created by a heat exchanger vibrating its surrounding enclosure or ductwork, it is an object of the invention to provide the heat exchanger with double vibration isolation.

Another object of the invention is to provide a heat exchanger with double vibration isolation using an intermediate vibration isolation plate that is of sufficient mass to isolate the heat exchanger more effectively than would be possible with a single layer of isolation.

A further object is to provide a heat exchanger with double vibration isolation using an intermediate vibration isolation plate that is thicker than the sheet metal of an enclosure in which the heat exchanger is installed.

A still further object of the invention is to provide double vibration isolation for a compressor and heat exchanger combination.

Yet another object is to provide a heat pump having two heat exchangers coupled to a compressor, wherein the heat exchanger closest to the compressor is provided with double vibration isolation to reduce noise, while the other heat exchanger is more firmly mounted to add rigidity to an enclosure that surrounds the heat pump.

Another object of the invention is to install a network of heat pumps and its associated piping and ductwork above several comfort zones, while providing each heat pump with double vibration isolation that includes an intermediate vibration isolation plate interposed between the comfort zone and a heat exchanger of the heat pump.

These and other objects of the invention are provided by a heat exchanger that is coupled to a vibration isolation plate by way of a first resilient member, while a second resilient member couples the plate to an enclosure that contains the heat exchanger.

DESCRIPTION OF THE PREFERRED EMBODIMENT

Figure 1:
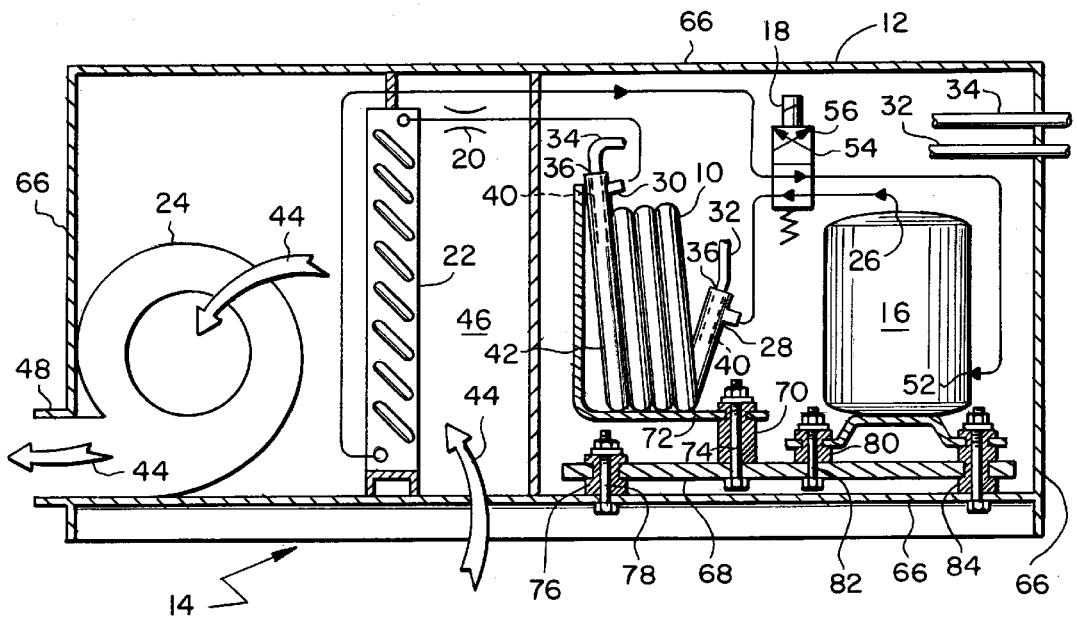
FIG. 1 is a cross-sectional view of a heat pump incorporating the subject invention with some portions of the heat pump being schematically illustrated.

Referring to FIG. 1, a heat exchanger 10 is installed with double vibration isolation within a sheet metal enclosure 12. Although heat exchanger 10 is readily applied to a variety of heating, ventilating, and air conditioning systems, it is preferably incorporated within a heat pump 14. Thus, a preferred embodiment of the invention will be described with reference to heat pump 14.

In this example, heat pump 14 includes sheet metal enclosure 12, a refrigerant compressor 16, a solenoid actuated directional valve 18, heat exchanger 10, a flow restriction 20 (e.g., an expansion valve), a second heat exchanger 22, and a blower 24. Valve 18 determines the direction of refrigerant flow to render heat pump 14 selectively operable in a heating or cooling mode.

In the cooling mode, valve 18 is positioned as shown to direct relatively hot, pressurized refrigerant from a discharge port 26 of compressor 16 into a port 28 of heat exchanger 10. The refrigerant passes through heat exchanger 10 before discharging through a second port 30 of heat exchanger 10. Heat exchanger 10 places the refrigerant in heat transfer relationship with a second fluid, such as ground water, well water, municipal water, etc. A liquid supply line 32 and a liquid return line 34 respectively convey the water to and from ports 36 and 38 of heat exchanger 10. In this example, refrigerant-to-liquid heat transfer within heat exchanger 10 is provided by conveying the water through an inner tube 40 of heat exchanger 10 and conveying the refrigerant between the exterior of inner tube 40 and an outer tube 42 of heat exchanger 10. Tubes 40 and 42 are both helically coiled with inner tube 40 being disposed within outer tube 42. In the cooling mode, the water cools the pressurized refrigerant in heat exchanger 10. The still pressurized, but cooler refrigerant discharging from port 36 passes through flow restriction 20. Upon passing through restriction 20, the refrigerant's pressure and temperature decreases. The refrigerant downstream of restriction 20 then passes through heat exchanger 22 to place the relatively cool refrigerant in heat transfer relationship with a current of air 44 created by blower 24. The current of air 44 generally moves from a return air chamber 46 to a supply air duct 48. The refrigerant in refrigerant-to-air heat exchanger 22 cools air 44, which in turn is conveyed onto a comfort zone 50 (FIG. 2) by way of air duct 48. Refrigerant having been warmed by air 44 is returned to a suction port 52 of compressor 16 to repeat the refrigerant cycle.

In the heating mode, valve 18 shifts so that a port 54 within valve 18 directs pressurized refrigerant from compressor 16 into heat exchanger 22, where the relatively hot refrigerant now warms, rather than cools air 44. From heat exchanger 22, the refrigerant passes through restriction 20 to provide relatively cool, lower pressure refrigerant to heat exchanger 10. In heat exchanger 10, the refrigerant absorbs heat from the water passing through inner tube 40. Another port 56 of valve 18 then directs the warmer refrigerant back to suction port 52 to repeat the refrigerant cycle in the heating mode.

Figure 2:
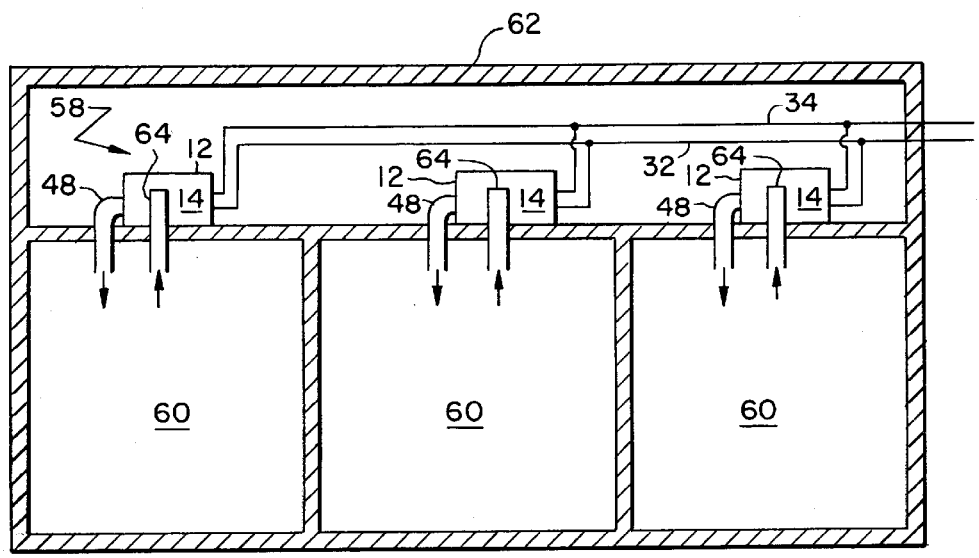
FIG. 2 is a cross-sectional view of a building with a heat exchange system that includes several interconnected heat pumps, each of which incorporate the subject invention.

Heat pumps, such as heat pump 14, lend themselves well to a heat exchange system 58 where several heat pumps 14 interconnected by liquid lines 32 and 34 independently serve several comfort zones 60 within a building 62, as shown in FIG. 2. In the illustrated example, each heat pump 14 is in fluid communication with a comfort zone 60 by way of supply air duct 48 downstream of blower 24 and a return air duct 64 feeding chamber 46. In such a system, the most convenient location for installing the heat pumps is often overhead, above the comfort zone they serve. When installed at such a location, it becomes very important to minimize any noise caused by heat pumps 14.

Typically, noise originates at the compressor, which tends to vibrate due to its moving parts. However, compressor 16 being rather rigidly piped a relatively short distance to heat exchanger 10 causes heat exchanger 10 to vibrate as well. If not dealt with, the vibration of heat exchanger 10 can transfer to a sheet metal wall 66 along a top, bottom, and/or side of enclosure 12. Vibration of sheet metal often produces objectionable noise, due to the relatively large surface area of the sheet metal and its other physical characteristics.

To minimize the noise, a vibration isolation plate 68 is interposed between heat exchanger 10 and wall 66, i.e., plate 68 couples heat exchanger 10 to wall 66, but is not necessarily physically "between" heat exchanger 10 and any particular wall 66. For example, plate 68 should be considered as being interposed between heat exchanger 10 and an upper sheet metal wall 66 of enclosure 12. A first resilient member 70 or isolator, such a rubber or polymeric grommet or spring provides a vibration-absorbing connection between plate 68 and a bracket 72 of heat exchanger 10. A bolt 74 fastens isolator 70 to plate 68. A second resilient member 76 (one or more) similar to isolator 70 provides a vibration-absorbing connection between plate 68 and enclosure 12. Another bolt 78 fastens isolator 76 to enclosure 12.

Together, the mass of heat exchanger 10, the mass of plate 68, and isolators 70 and 76 emulate a dual mass/spring system having two degrees of freedom. Ideally, the resulting vibration or noise transmitted to enclosure 12 has two high-response frequencies, rather than one as found in a simple mass/spring system having one degree of freedom. As a result, the amplitude of vibration drops off significantly at frequencies above the two high-response frequencies to provide a quieter system overall. To achieve such results, it has been found that vibration isolation plate 68 should have an appreciable amount of mass. More specifically, the thickness of plate 68 is preferably thicker than the sheet metal thickness of enclosure wall 66 (along the top, bottom, and/or side of the enclosure). In one embodiment, plate 68 is made of 10-gage sheet metal, while a significant portion of enclosure wall 66 is made of 18-gage sheet metal.

Although isolator 70 is the primary "spring" between heat exchanger 10 and plate 68, some additional spring-effect is provided by the resilience of bracket 72 itself. It would also be well within the scope of the invention for the resilience of bracket 72 alone to provide all the spring effect. In such a case, bracket 72 would then be considered as a first resilient member coupling heat exchanger 10 to plate 68.

In some embodiments, as shown in FIG. 1, a third resilient member 80, plus a bolt 82, couples compressor 16 to plate 68. This helps isolate vibration of compressor 16 relative to plate 68.

It should be appreciated by those skilled in the art that the actual structure of isolators 70, 76 and 80 can vary and yet still remain within the scope of the invention. Isolator 84, for example, basically combines isolator 76 and 80 as a single unitary piece. In other words, rather than discrete individual elements, isolators 76 and 80 basically become an integral extension of each other. An example of isolators 70, 76 and 80 includes, but is not limited to, a model J4624 manufactured by Lord Corporation of Erie, Pa.

In some embodiments, heat exchanger 10 is substantially fixed relative to enclosure 12, which is readily done, since heat exchanger 22 is farther from compressor 16 than is heat exchanger 10. The extra length of pipe or tubing results in less compressor vibration transferred to heat exchanger 22. In some cases, heat exchanger 22 being fixed to enclosure 12 adds to the enclosure's overall rigidity, and thus reduces the enclosure's tendency to vibrate and emit noise.

Although the invention is described with respect to a preferred embodiment, various modifications thereto will be apparent to those skilled in the art. For example, in some embodiments, a solenoid-actuated valve is connected to supply line 32 or return line 34 to control the flow of water through heat exchanger 10. The actual direction of airflow 14 in and out of enclosure 12 can be from any side, top or bottom of enclosure 12. Other variations are also well within the scope of the invention. Therefore, the scope of the invention is to be determined by reference to the claims, which follow.

I claim:

1. A heat exchanger assembly, comprising:
   an enclosure having an enclosure wall;
   a first heat exchanger disposed within said enclosure;
   a vibration isolation plate interposed between said enclosure wall and said first heat exchanger;
   a first resilient member coupling said first heat exchanger to said vibration isolation plate;
   a second resilient member coupling said vibration isolation plate to said enclosure wall; and
   wherein said vibration isolation plate is thicker than said enclosure wall.

2. The heat exchanger assembly of claim 1, wherein at least one of said first resilient member and said second resilient member consists of a polymer.

3. A heat exchanger assembly, comprising:

an enclosure having an enclosure wall;

a first heat exchanger disposed within said enclosure;

a vibration isolation plate interposed between said enclosure wall and said first heat exchanger;

a first resilient member coupling said first heat exchanger to said vibration isolation plate;

a second resilient member coupling said vibration isolation plate to said enclosure wall; and a compressor piped to said first heat exchanger and coupled to said vibration isolation plate by way of a third resilient member.

4. The heat exchanger assembly of claim 3, wherein said first resilient member, said second resilient member and said third resilient member are discrete individual elements.

5. A heat exchanger assembly, comprising:

an enclosure having an enclosure wall;

a first heat exchanger disposed within said enclosure;

a vibration isolation plate interposed between said enclosure wall and said first heat exchanger;

a first resilient member coupling said first heat exchanger to said vibration isolation plate;

a second resilient member coupling said vibration isolation plate to said enclosure wall; and wherein said second resilient member is an integral extension of said first resilient member, whereby said first resilient member and said second resilient member comprise a single unitary piece.

6. A heat exchanger assembly, comprising:

an enclosure having an enclosure wall;

a first heat exchanger disposed within said enclosure;

a vibration isolation plate interposed between said enclosure wall and said first heat exchanger;

a first resilient member coupling said first heat exchanger to said vibration isolation plate;

a second resilient member coupling said vibration isolation plate to said enclosure wall; and a second heat exchanger disposed within said enclosure and being held in a more fixed relationship with said enclosure than that of said first heat exchanger with said enclosure.

7. The heat exchanger assembly of claim 6, wherein said first heat exchanger conveys a refrigerant in heat transfer relationship with a liquid, and said second heat exchanger conveys said refrigerant in heat transfer relationship with a current of air.

8. The heat exchanger assembly of claim 7, further comprising a blower disposed within said enclosure and being adapted to provide said current of air.

9. A heat exchanger assembly, comprising:

an enclosure having an enclosure wall;

a first heat exchanger disposed within said enclosure;

a vibration isolation plate interposed between said enclosure wall and said first heat exchanger;

a first resilient member coupling said first heat exchanger to said vibration isolation plate;

a second resilient member coupling said vibration isolation plate to said enclosure wall;

a compressor piped to said first heat exchanger; and a third resilient member coupling said compressor to said isolation plate.

10. The heat exchanger assembly of claim 9, wherein said vibration isolation plate is thicker than said enclosure wall.

11. The heat exchanger assembly of claim 9, further comprising a second heat exchanger disposed within said enclosure and being held substantially fixed relative to said enclosure.

12. The heat exchanger assembly of claim 11, further comprising a blower disposed within said enclosure.

13. The heat exchanger assembly of claim 12, wherein said first heat exchanger conveys a refrigerant in heat transfer relationship with a liquid, and said second heat exchanger conveys said refrigerant in heat transfer relationship with a current of air provided by said blower.

14. A heat exchange system for conditioning the temperature of a plurality of comfort zones within a building, comprising:

a plurality of heat pumps disposed overhead said plurality of comfort zones, wherein each of said heat pumps include an enclosure that contains a compressor, a liquid-to-refrigerant heat exchanger, an air-to-refrigerant heat exchanger, a blower, a first isolation member, a second isolation member, a third isolation member, and a vibration isolation plate disposed underneath both said compressor and said liquid-to-refrigerant heat exchanger, wherein said first isolation member couples said liquid-to-refrigerant heat exchanger to said vibration isolation plate, said second isolation member couples said compressor to said vibration isolation plate, and said third isolation member couples said vibration isolation plate to said enclosure;

a liquid supply line interconnecting each of said liquid-to-refrigerant heat exchangers of said plurality of heat pumps;

a liquid return line interconnecting each of said liquid-to-refrigerant heat exchangers of said plurality of heat pumps; and a plurality of air ducts placing each of said enclosures of said plurality of heat pumps in fluid communication with said plurality of comfort zones.

15. The heat exchange system of claim 14, wherein said enclosure comprises an enclosure wall that is thinner than said vibration isolation plate.

16. The heat exchange system of claim 14, wherein at least one of said first resilient member, said second resilient member, and said third resilient member consists of a polymer.

17. The heat exchange system of claim 14, wherein said liquid-to-refrigerant heat exchanger includes one tube disposed within an outer tube.

* * * * *